B. W. DAVIS.
Nut-Locks.

No. 136,906.　　　　　　　　　Patented March 18, 1873.

Attest:
Wm. W. S. Dyre.
Wm. Withart

Inventor:
Benjamin W. Davis
By Johnston & Grindlay
his Attorneys

UNITED STATES PATENT OFFICE.

BENJAMIN W. DAVIS, OF FORT MADISON, IOWA.

IMPROVEMENT IN NUT-LOCKS.

Specification forming part of Letters Patent No. 136,906, dated March 18, 1873.

*To all whom it may concern:*

Be it known that I, BENJAMIN W. DAVIS, of Fort Madison, in the county of Lee and State of Iowa, have invented a new and useful Improvement in Device for Locking Nuts; and I do hereby declare that the following is a full and exact description thereof, reference being had to the accompanying drawing and to the letters of reference marked thereon.

The nature of my invention consists in securing the nuts upon bolts used in combination with fish-bars for railway purposes by means of a curved elliptic steel spring extending from one bolt to the other, and furnished with elongated openings for the bolts, and a lip or shoulder at each end to prevent the nut from turning.

Figure 1:
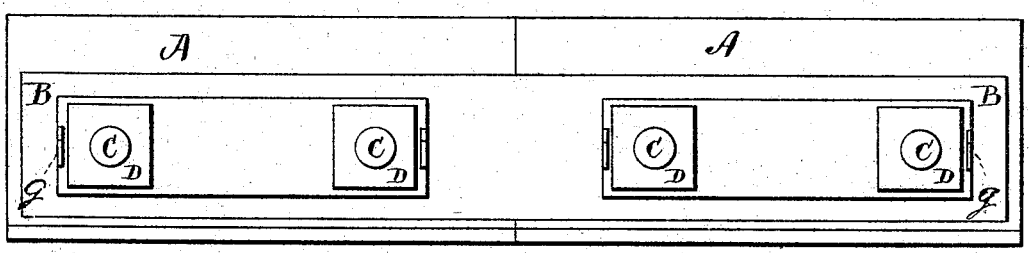
Figure 2:
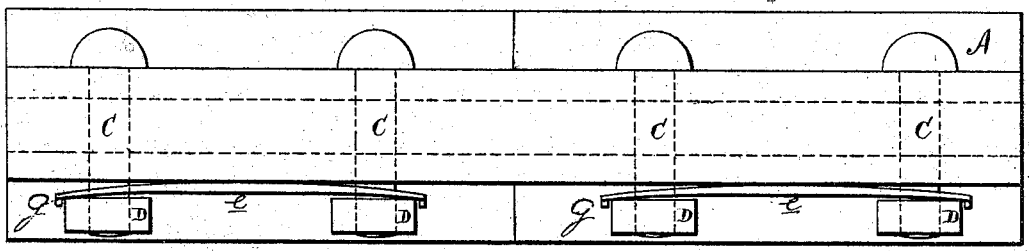
Figure 3:
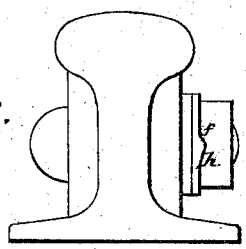

In the accompanying drawing, which forms part of my specification, Figure 1 is a side elevation of two rails coupled together and furnished with my improvement for locking nuts. Fig. 2 is a longitudinal view of the same. Fig. 3 is an end view of the spring, showing the inclines of the lip and the relation of the lip to the nut.

To enable others skilled in the art to make and use my invention, I will proceed to describe more fully its construction and operation.

A represents the rails of railways. B represents the ordinary fish-bars. C represents the bolts, and D the nuts used in combination with the fish-bars, and are of ordinary construction. *e* is a curved spring, provided with elongated openings for the bolts C to allow for the movements of the bolts occasioned by the expansion of the rails in warm weather or their contraction in cold weather. *g* represents the lip or shoulder on the ends of the curved spring *e*, and which forms a part of said spring, which will effectually prevent the nuts D from turning. The tension of the spring upon the nuts prevents the rattling of the bolts and jarring of the nuts upon them, and the lip *g* prevents them from turning upon the bolts. The lip *g* can be made as herein described, or a projection can be made with a punch on the outside of the curved spring, which would accomplish the same result—namely, the holding of the nut and preventing it from turning on the bolt.

The hereinbefore-described device will securely hold the nuts in the desired position with relation to the bolts and fish-bars, and also prevent the rattling and jarring of the nuts, bolts, and fish-bars during the passage of the wheels of the cars over the "fish-joints" of railways, and will completely and perfectly compensate for the expansion and contraction of the several parts connected with the fish-joints, occasioned by the variation of the temperature of the weather. The inclines of the lip *g* will allow the nut, in screwing it on or off the bolt, to pass over the lip. The nut, in passing up the inclines, will force back the spring *e*, which will return to its position when the sides of the nut are parallel with the longitudinal plane of the lip *g*.

It will be observed that there is no change in the form of the bolts or nuts, nor of the fish-bar, all these being of ordinary construction.

The main and essential feature of my invention consists in providing a device for locking the ordinary nut upon the ordinarily-constructed bolt by means of a curved spring, on the outer face of which, at its ends, are projections having inclines, as before described, and so arranged with relation to the nuts of the bolts used in combination with the fish-bars that said projections will prevent the nuts from turning upon their bolts without the interposition of ratchet-washers or similar contrivance, and without any change whatever in the form or construction of the nuts for the bolts, thus adapting the said spring to the nuts and bolts for fish-joints now in universal use on railways.

Having thus described my improvement, what I claim as my invention is—

The curved spring *e*, provided with elongated openings for the bolts C, and also provided on its outer ends with vertically-projecting lips *g* having inclines and bearing against the side of the nuts, in combination with the ordinarily-constructed nuts D and fish-bar B, substantially as hereinbefore described, and for the purpose set forth.

BENJAMIN W. DAVIS.

Witnesses:
R. A. GORDON,
J. K. HORNISH.